United States Patent [19]

Palma

[11] 4,310,943
[45] Jan. 19, 1982

[54] VEHICLE WINDOW CLEANING SYSTEM

[75] Inventor: Victor J. Palma, Canton Township, Madison County, Mich.

[73] Assignee: American Motors Corporation-Jeep, Southfield, Mich.

[21] Appl. No.: 144,133

[22] Filed: Apr. 28, 1980

[51] Int. Cl.³ .............................................. B60S 1/46
[52] U.S. Cl. .............................. 15/250.01; 15/250.16; 15/250.19; 296/93
[58] Field of Search ............ 15/250.01, 250.1, 250.16, 15/250.17, 250.25, 250.26, 250.27, 250.3, 250.19; 296/84 R, 84 N, 84 D, 93, 95 R

[56] References Cited

U.S. PATENT DOCUMENTS

| | | | |
|---|---|---|---|
| 1,640,088 | 8/1927 | Megown | 296/95 R |
| 1,780,502 | 11/1930 | Otto | 296/95 R |
| 1,962,449 | 6/1934 | Ledwinka | 296/200 X |
| 2,714,035 | 7/1955 | Limberg et al. | 296/93 X |
| 3,019,468 | 2/1962 | Hatch | 15/250.19 |
| 4,060,272 | 11/1977 | Mori | 296/93 |
| 4,091,494 | 5/1978 | Dunhill et al. | 15/250.16 |

FOREIGN PATENT DOCUMENTS

| | | | |
|---|---|---|---|
| 410059 | 5/1934 | United Kingdom | 15/250.16 |
| 2031499 | 4/1980 | United Kingdom | 296/93 |

Primary Examiner—Peter Feldman
Attorney, Agent, or Firm—Reising, Ethington, Barnard, Perry & Brooks

[57] ABSTRACT

A vehicle window cleaning system disclosed includes window wipers which are movable in a controlled fashion off a glass pane of the vehicle window of the drop glass type, and which are protected, out of view, between a header portion of the vehicle and a molded body extension secured to the vehicle when parked. Actuating arms of the wipers include offset segments which engage and follow a pair of spaced finger guides mounted on the header portion of the vehicle through a park stroke. The guide fingers define guide paths for the blades of the window wipers which closely approximate and track the outer exterior surface of a weather seal which seals the header portion and the glass pane of the window when the weather seal is engaged by the window pane. The molded body extension not only conceals the window wipers but also any unfinished body metal seams and/or welds between the header portion and other metal body panels. As the window wipers move off the window pane and over the stressed weather seal they move through a restricted access opening defined by a bottom edge of the molded body extension and the window pane.

10 Claims, 5 Drawing Figures

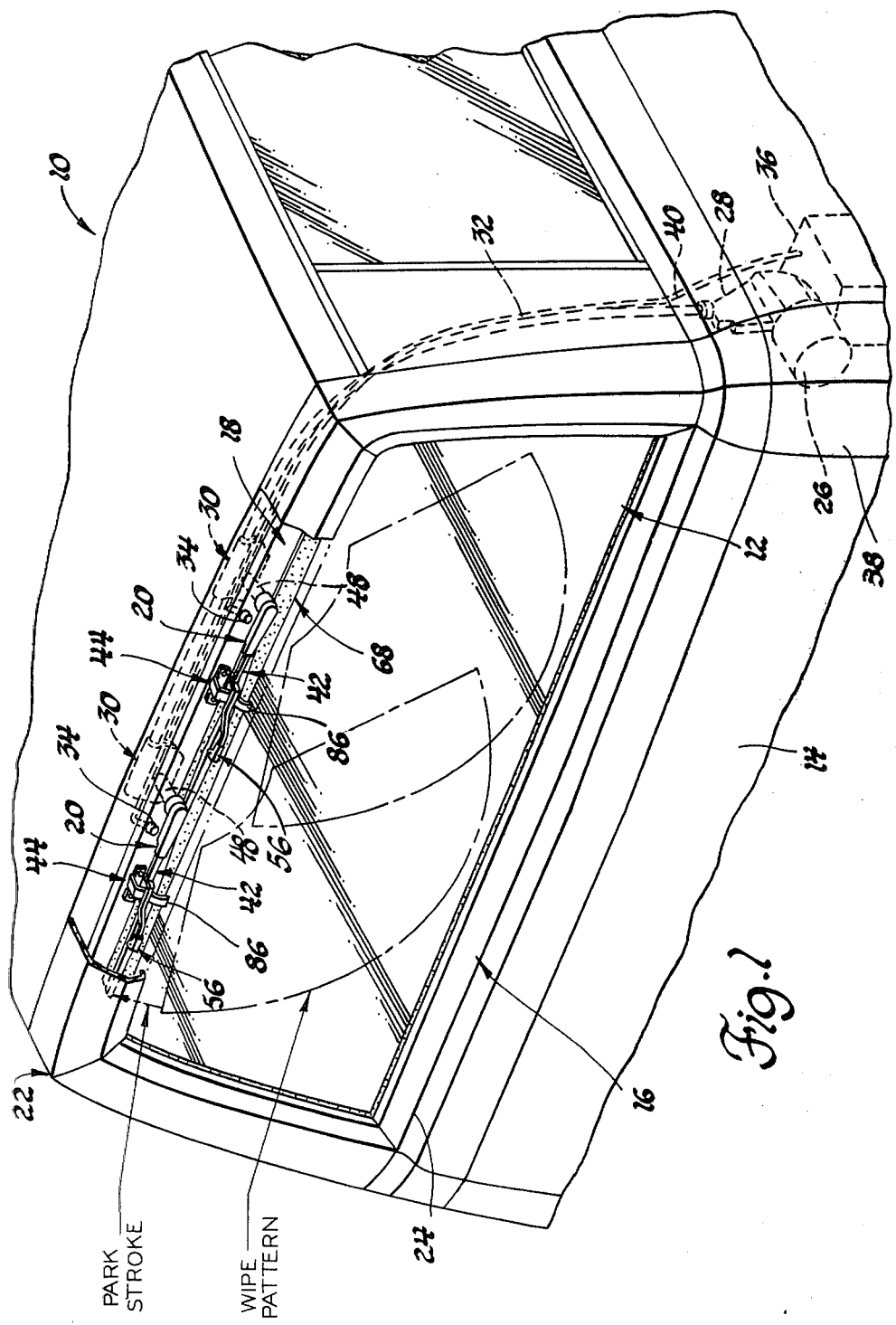

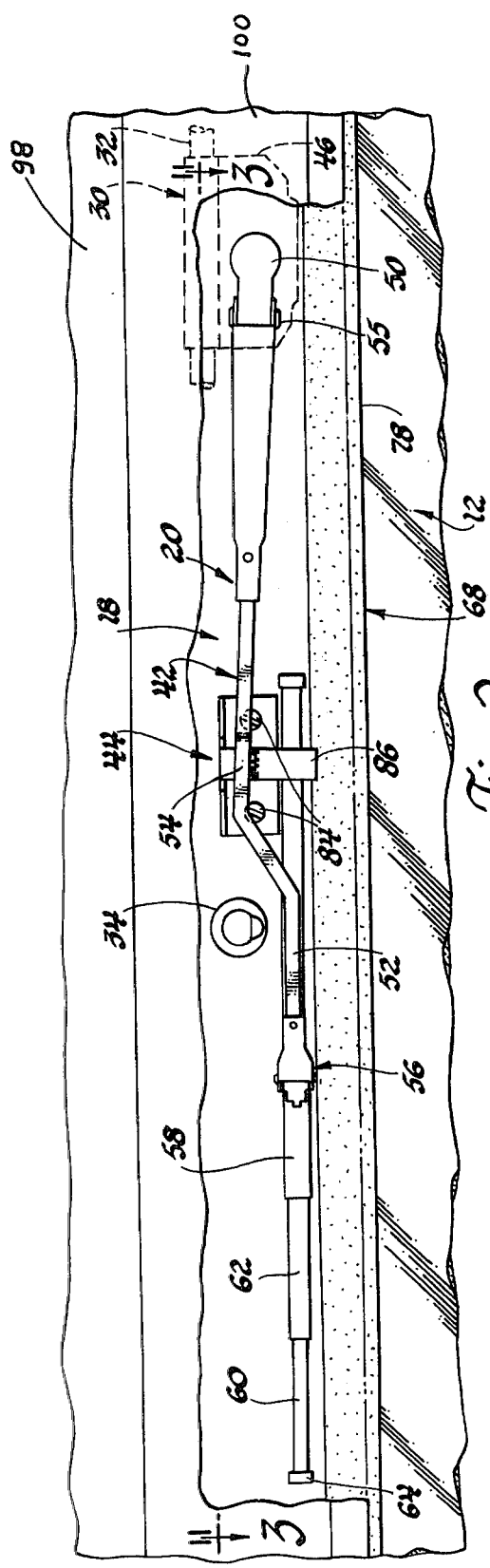
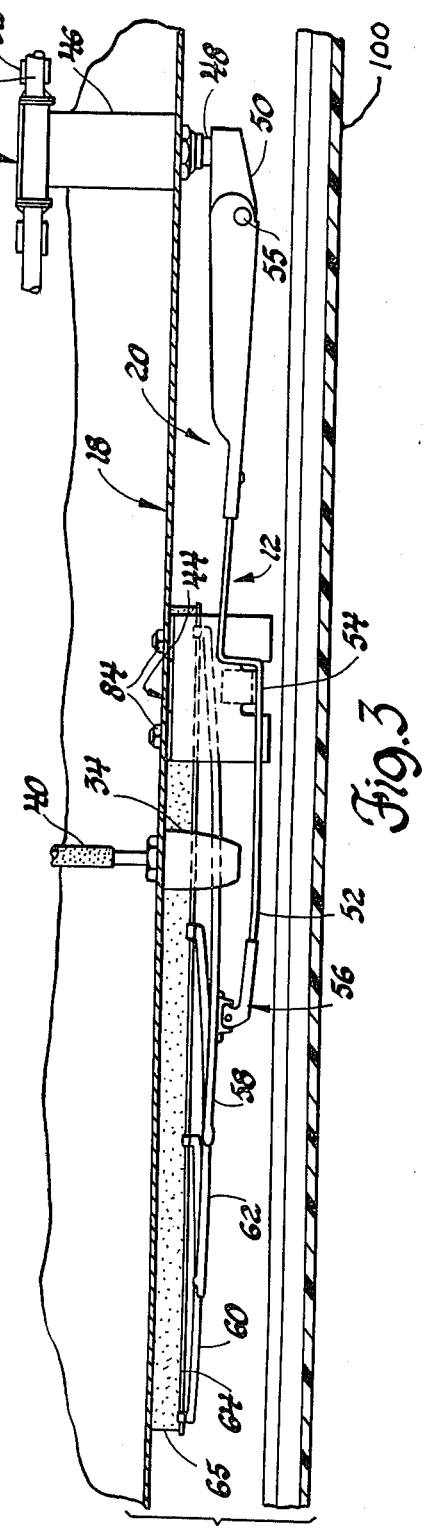

VEHICLE WINDOW CLEANING SYSTEM

TECHNICAL FIELD

This invention relates to vehicle window cleaning systems and, more particularly, to cleaning systems having window wipers which are movable off the window glass.

BACKGROUND ART

A number of automobiles now provide wipers for rear windows where the rear window has a tendency to become deposited with contaminants and rain water that obscure the rear field of vision. These wipers are in many respects similar to conventional front windshield wiper systems in operation.

More specifically, a conventional window wiper system typically has at least one pivotal wiper arm fitted with a rubber blade to effect a squeegee action when the wiper arm is pivoted through a wipe pattern across the window. The wiper arm begins at rest from a park position on the edge of the glass boundary of the window and initially traverses a park stroke to enter a reciprocating, pivotal motion through the wipe pattern. The wiper concludes its operation by traversing the park stroke in the opposite direction and returning to the park position. This sequence of motion is governed by a wiper motor and transmission which are conventional in the art.

It is often desirable to remove the wiper blade from the glass pane of the window during the park stroke. It is necessary to remove the wiper blade from the glass pane when the vehicle window is of the drop glass type, i.e. where the glass may be retracted within the body or door panel of the vehicle to open the window and may be extended into the window opening to close the window. This type of window must be fitted with a wiper which parks off the glass to permit window opening and closing.

The air and liquid seal or molding which is generally provided between the window glass and frame to provide a seal between the two requires that the window glass must be recessed relative to the frame. As a consequence, any wiper fitted to such a window must be capable of movement with two degrees of freedom, i.e. through the dimension of recess and through the wipe pattern on the glass surface.

It is known to provide an inclined surface or a cam face which operates with the arm of a windshield wiper mechanism in such a manner that when the arm and thereby a blade thereof moves to a rest or park position the blade is lifted off the windshield to free it of stress. However, in many instances space limitations make it difficult to provide such an inclined cam face, or else require that the cam face be at a location on the vehicle which presents unacceptable problems either from a point of view of aesthetics or for operational considerations. For instance, the location must be such that the windshield wiper arm does not freeze to the cam face in cold weather conditions.

Prior patents disclose windshield wiper mechanisms which include cams which guide the wiper arms from a working position where the wiper blade contacts a window pane to a rest or park position where the wiper blade is moved away from the surface of the window pane and is disposed in an out-of-the-way position relative to the window. For example, the U.S. Pat. No. of Dunhill et al, 4,091,494 discloses an adjustable mounting with a pair of threaded fasteners having a guide or cam which projects outwardly from the pane of the glass. The cam functions like a ramp to guide the wiper blades through the park stroke. Likewise, the U.S. Pat. No. of Mainka 3,604,048 discloses a wiper system including guide means in the form of a cooperating cam and follower to impart axial movement to the wiper arm to lift it off the windshield in a rest position.

Other wiper mechanisms generally of the type to which this invention relates are disclosed by the U.S. Pat. Nos. of Hatch, 3,019,468, Carpenter et al, 3,107,383, Burke, 1,787,894, Oishei, 1,826,672, Oishei, 1,937,160, Dangler, 3,110,920, and O'Steen, 4,040,141.

DISCLOSURE OF THE INVENTION

The preferred form of the invention is embodied as a window cleaning system for a rear, drop glass, vehicle window, e.g. of the type on a utility station wagon. In this embodiment the system includes one or more wiper arms disposed on the window frame above the glass pane. Each wiper arm has a pivotal axis for rotation of the arm from a park position through a wipe pattern. The arm enters the wiper pattern through a park stroke in which the arm is brought downward and inward from the park position on the frame; the exit from the park stroke is by mutually opposite movement. Each wiper arm is guided through the park stroke by guide means as it is driven by a wiper motor.

The guide means takes the form of a cam and follower arrangement. The cam is preferably formed as a projecting guide finger having a shape or configuration defining the park stroke. The follower is formed as a central offset segment of the wiper arm which engages and is guided by the projecting guide finger. Specifically, the finger guides the travel of the wiper arm through the park stroke in both transverse axes of travel, i.e. vertically and horizontally.

An object of the present invention is to provide a window cleaning system for a vehicle glass window which aesthetically conceals and protects window wipers of the system in a park position off the window glass.

Another object of this invention is to provide a window cleaning system which is suited especially for a drop glass window.

A further object of the invention is to provide a window cleaning system for a vehicle having window wipers which are movable off the window glass along a guide path slightly above the outer exterior surface of a compressed weather seal such that the guide path tracks the contour of the outer exterior surface so that the distance that the wiper blades travel transversely to the window glass during the park stroke is minimized.

In carrying out the above objects and other objects of this invention for a vehicle having a drop glass window of the type in which a pane of glass is movable between an open position and a closed position, the vehicle including a header portion adapted to receive a marginal edge of the glass pane, a preferred embodiment of a window cleaning system includes a wiper means mounted on the vehicle and movable from a park position through a range of travel over the window glass to define a wipe pattern for wiping the window glass free of deposited matter within the wipe pattern. A drive means mounted on the vehicle provides a source of controlled drive power to move the wiper means. Guide means mounted on the vehicle guide the wiper means along a guide path between the park position and an inward limit position of the wipe pattern. The guide means includes a cam guide spaced upwardly and outwardly from the marginal edge of the glass pane in its closed position and configured to define the guide path. The wiper means includes at least one wiper arm pivotable about a pivot axis on the header portion and a wiper blade assembly secured to the wiper arm. The wiper arm includes a segment offset upwardly and outwardly away from the wiper blade assembly. The offset segment defines a cam follower adapted to engage and follow the cam guide between the inward limit position and the park position.

The preferred form of the invention also includes an end cap member mounted on the vehicle and extending over at least a part of the header portion to substantially seal the inner connection between the roof of the vehicle and the header portion. The end cap member defines a concealed storage area therebetween. A bottom edge portion of the end cap member and the glass pane define a restricted access opening to the storage area when the glass pane is in its closed position.

A preferred form of the invention further includes a deformable weather seal mounted on the header portion such that the weather seal is deformed upon engagement by a marginal edge of the glass pane in the closed position to seal the glass pane. In the closed position, the wiper blades track the outer exterior surface of the weather seal during the park stroke.

The objects, features and advantages of the present invention are readily apparent from the following description of the best mode taken in connection with the accompanying drawings.

BRIEF DESCRIPTION OF THE DRAWINGS

FIG. 1 is a perspective view, partially broken away, which shows a cleaning system for a vehicle window constructed according to this invention, part of the cleaning system being shown in phantom;

FIG. 2 is a side elevational view, partially broken away, of the cleaning system of FIG. 1, with a part of the cleaning system shown in phantom;

FIG. 3 is a sectional view of the cleaning system taken along line 3—3 of FIG. 1;

BEST MODE FOR CARRYING OUT THE INVENTION

Figure 4:
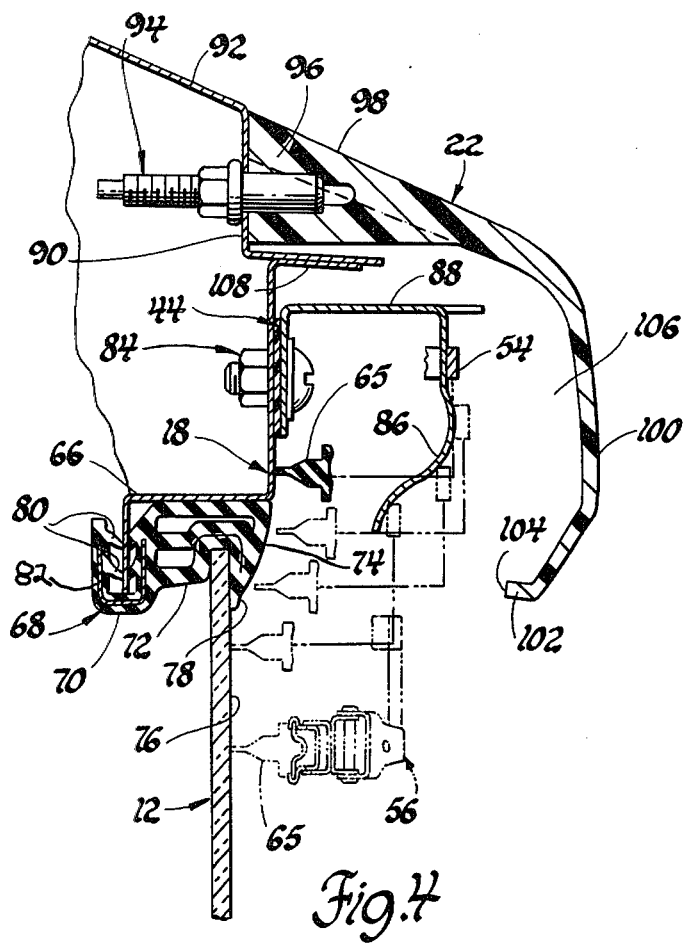
FIG. 4 is a sectional view, partially broken away, showing a window wiper of the cleaning system in phantom as the window wiper moves through its park stroke.

Referring to FIG. 1, there is shown the back end of a motor vehicle 10 having a drop glass window 12, which may be raised or lowered from within a tailgate 14 in a conventional fashion. The window glass 12 is mounted within a window frame 16 having an upper portion which includes a rear header 18 which comprises a sheet metal header extension panel. A pair of substantially identical window wiper assemblies 20 are mounted on the rear header 18 of the window frame 16.

The wiper assemblies 20 are shown in their park or storage positions in FIG. 1. The wiper assemblies 20 are concealed by a molded body extension 22 which comprises a "horse collar end cap member" which is mounted to the vehicle 10. The molded body extension 22 extends rearwardly from the roofline of the vehicle 10 and downwardly toward a bottom portion 24 of the window frame 16.

A conventional wiper motor 26 provides the motor power to drive both of the wiper assemblies 20. The wiper motor 26 drives the wiper assemblies 20 through a conventional wiper motor transmission 28 which has a built-in fourteen degree park angle. In other words, the wiper motor 26 drives the wiper assemblies 20 through a predetermined arc or wipe pattern during the window cleaning operation, and through an additional predetermined arc or park stroke, which preferably comprises fourteen degrees, beyond the normal cleaning arc when being parked under the molded body extension 22. A drive linkage comprising a flexible cable 29, as shown in FIG. 3, extends from the transmission 28 to a pair of pivot assemblies 30 within a tubular housing 32 to transmit drive torque from the wiper motor 26 to the wiper assemblies 20.

Also mounted on the header portion 18 of the window frame 16 are a pair of conventional washer nozzles 34 which supply cleaning fluid to the window glass 12. The cleaning fluid is stored in a washer fluid reservoir 36 which is preferably located in the lower rear pillar 38 of the vehicle 10, but which may also be located under the vehicle hood. A washer hose 40 extends from the washer fluid reservoir 36 to the washer nozzles 34 to communicate the washer fluid to the nozzles 34.

During the park stroke in which the wiper assemblies 20 are brought upward and outward off the window glass 12, each wiper arm 42 of the wiper assemblies 20 is guided through the park stroke by a guide mechanism 44 fixedly mounted on the rear header 18 which takes the form of a cam and follower arrangement.

With reference to FIGS. 2 and 3, each of the wiper assemblies 20 and each of the pivot assemblies 30 will be described in greater detail. Each pivot assembly 30 includes drive wheels (not shown) within a bushing 46 which are oscillated by a rack on the flexible cable 29 contained within the tubular housing 32. When the drive wheels are oscillated they, in turn, rotate a conventional rock shaft 48. The inner end 50 of each wiper arm 42 receives the outer end of the rock shaft 48 to be oscillated thereby. The inner and outer ends 50 and 52, respectively, of the wiper arm 42 are pivotally connected together by a pivot pin 55. A conventional biasing spring arrangement (not shown) is provided between the inner and outer ends 50 and 52, respectively, for urging the outer end 52 of the wiper arm 42 towards the surface of the window glass 12 in a known manner. A central segment 54 of the outer end 52 of the wiper arm 42 is offset upwardly and outwardly away from the wiper blade assembly 56 and is releasably secured at the end of the wiper arm 42 opposite the rock shaft 48. Except for the specific configuration of the central segment 54, each window wiper assembly 20 is of a conventional design as will become more apparent as the description of the present invention proceeds hereinbelow.

Each wiper blade assembly 56 includes a pressure distributing superstructure including a rigid centering yoke 58 and a pair of interconnected levers 60 and 62, all of which are connected to a backing member 64 which is secured to a flexible blade body 66.

While not shown, a switch may be located within the vehicle 10 which, when moved to its "on" position will cause the wiper blade assemblies 56 and their associated wiper arms 42 to move back and forth across the glass window. In the "off" position of the switch, the wiper blade assemblies 56 will be lifted up and off the window glass 12 as will be described in greater detail hereinbelow. In order to prevent the wiper motor 36 from being energized when the glass window 12 is open, the wiper motor 36 may be associated with a trip or switch (not shown) which, when the window glass 12 is not fully closed, opens to disable energization of the wiper motor 36. When the window glass 12 is closed, the switch is closed to allow the wiper motor 36 to be energized.

Figure 5:
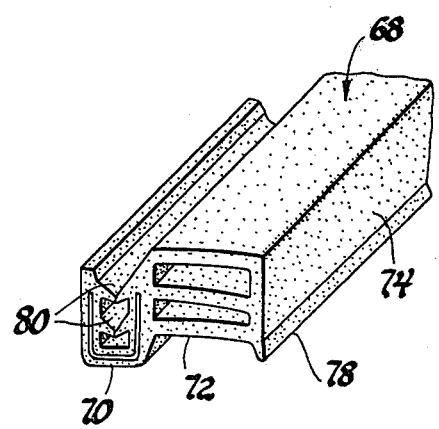
FIG. 5 is a perspective view, partially broken away, of a weather seal particularly constructed for use with the present invention.

Referring now to FIGS. 4 and 5, the window glass 12 is shown housed at its upper edge within an inner flange portion 66 of the rear header 18 which carries a weather seal 68. The weather seal 68 is in a stressed or deformed condition in abutting engagement with the window glass 12 in its closed position in FIG. 4. FIG. 5 shows the weather seal 68 in its relaxed or unstressed condition.

The weather seal 68 comprises a substantially hollow, elongated, elastomeric member having a mounting portion 70 for mounting the weather seal 68 to the bent flange portion 66 of the header 18. The weather seal 68 also includes a sealing portion 72 integrally formed with the mounting portion. The sealing portion 72 is deformed by the window glass 12 in its closed position in such a manner that an outer exterior surface 74 of the sealing portion 72 moves inwardly towards the outer surface 76 of the glass pane 12 to cause an integrally formed lip portion 78 of the sealing portion 72 to seal against the glass. The lip portion 78 prevents water or other contaminants from moving over the top edge of the window glass 12.

The mounting portion 70 of the weather seal 68 includes two sets of opposing gripping members 80 to hold the weather seal 68 on the bent flange portion 66. The mounting portion 70 also includes a plurality of metal staple-shaped reinforcing members 82 embedded within the mounting portion 70 to enable it to retain its shape and secure its connection with the bent flange portion 66.

As shown in FIG. 4, the guide mechanisms 44 are fastened to the rear header 18 by conventional fastener assemblies 84. Each guide mechanism 44 includes a downwardly projecting, curved finger portion 86 spaced away from the rear header 18 by an integrally formed connector portion 88. The finger portion 86 has a configuration which closely resembles the configuration of the outer exterior surface 74 of the weather seal 68 when the weather seal is in its deformed condition as shown in FIG. 4. A central segment 54 of each of the wiper arms 42 slides along and is guided thereby their finger portions 86 during the park stroke. The finger portions 86 may have a highly polished outer surface or may be formed of stainless steel to assure a low coefficient of friction between the central segments 54 and the finger portions 86.

The configuration of the finger portions 86 of the guide mechanisms 44 which, as previously described, resembles the deformed outer exterior surface 74 of the weather seal 68, causes the blade bodies 65 to be raised during the park stroke of the wiper assembly 20 to thereby prevent interference between the weather seal 68 and the blade bodies 65. Moreover, the blade bodies 65 are lifted in a direction transverse to the window glass 12 only to the extent necessary to clear the weather seal 68. Generally, the greater the amount of transverse movement of the blade bodies 65 during the park stroke, the less area is covered by the wipe pattern of the blade assemblies 56. The slope of the finger portions 86 is small enough so that a relatively small amount of friction is present between the central segment 54 and the finger portion 86. A relatively large amount of friction in excess of the rating of the wiper motor 26 is to be avoided.

The end cap member 22 is mounted to the vehicle at a downwardly extending bent flange portion 90 of the roof panel 92 by conventional stud assemblies 94 which connect the molded body extension 22 to the roof panel 92 at rib portions 96 of the end cap member 22. The end cap member 22 includes a downwardly sloping top wall portion 98 which is aligned with and abuts the roof panel 92 to seal the roof panel 92. The end cap member 22 also includes a side wall portion 100 integrally formed with the top wall portion 98 and which is spaced from the rear header 18 thereby. The side wall portion 100 extends downwardly from the top wall portion 98 and terminates at a bottom edge portion 102. The side wall portion 100 and the window glass 12 define a restricted access opening 104 into a concealed storage area 106 defined by the end cap member 22, the rear header 18 and the outer exterior surface 74 of the weather seal 68. The restricted access opening 104 is sufficiently large to permit the wiper assemblies 20 to enter the storage 106 and be positioned in their park positions as indicated by the solid lines in FIG. 4. At the same time, the access opening 104 is small enough so tht the rear of the vehicle 10 is aesthetically appealing, conceals the wiper assemblies 20, and prevents the accumulation of contaminants such as ice and/or snow from interfering with the movement of the wiper assemblies 20 and the guiding action provided by the finger portions 86.

The concealing function provided by the end cap member 22 also seals the seam or interconnection between the bent flange portion 90 of the roof panel 92 and an upper flange portion 108 of the rear header 18. Because of this, a seam or interconnection there between need not be finished after the two flange portions 90 and 108 are welded together thereby eliminating the metal finishing steps normally associated with such a seam. Also, the welds located at the upper outboard corners (not shown) are hidden from view, thereby eliminating their normal metal finishing steps.

While a preferred embodiment of a vehicle window cleaning system has been shown and described herein in detail, those skilled in this art will recognize various alternative designs and embodiments for practicing the present invention within the scope of the following claims.

What is claimed is:

1. A vehicle window cleaning system for a vehicle having a drop glass window of the type in which a pane of glass is movable between an open position and a closed position, the vehicle including a header portion adapted to receive a marginal edge of the glass pane, the system comprising:

wiper means mounted on the vehicle and movable from a park position through a range of travel over the glass window to define a wipe pattern for wiping the glass window free of matter deposited on the glass window within the wipe pattern;

drive means mounted on the vehicle for providing a source of controlled drive power to move the wiper means; and guide means mounted on the vehicle for guiding the wiper means along a guide path between the park position and an inward limit position of the wipe pattern, said guide means including a cam guide spaced upwardly and outwardly from the marginal edge of the glass pane in the closed position of the pane of glass and configured to define the guide path, said wiper means including at least one wiper arm pivotable about a pivot axis on the header portion and a wiper blade assembly secured to the wiper arm, said wiper arm including a segment offset upwardly and outwardly away from the wiper blade assembly, said offset segment defining a cam follower adapted to engage and follow the cam guide between the inward limit position and the park position.

2. The system as claimed in claim 1, wherein, the cam guide comprises at least one finger projecting from the header portion.

3. The system as claimed in claim 1 wherein the wiper means includes a second wiper arm having a like offset segment and pivotable about a second pivotal axis spaced from the first pivot axis on the header portion and wherein said cam guide includes a second finger projecting from the header portion to engage and guide the second wiper arm at its offset segment.

4. The system as claimed in claim 3 wherein the first and second pivotal axes are located on an upper side part of the header portion.

5. The system as claimed in claim 1 wherein said drive means comprises,
wiper motor means for producing a controlled pattern of output torque in response to a control command, and
drive linkage means, interconnecting the wiper motor means and wiper means, for transmitting the output torque of the wiper motor means to the wiper means.

6. The system as claimed in claim 5 wherein the wiper motor means is disposed on the vehicle apart from the window frame, and the drive linkage means includes a flexible cable for establishing a drive connection between the wiper motor means and wiper means.

7. The system as claimed in claim 6 wherein the drive linkage means is connected to the wiper means by a rack.

8. The system as claimed in claim 7 wherein the rack is flexible and forms part of the flexible cable.

9. The system as claimed in claim 1 wherein the vehicle window is a rear window.

10. The system as claimed in claim 1 further comprising washer means mounted on the vehicle for dispensing cleaning fluid onto the glass pane to facilitate cleaning by the wiper means.

* * * * *

UNITED STATES PATENT AND TRADEMARK OFFICE
CERTIFICATE OF CORRECTION

PATENT NO. : 4,310,943
DATED : January 19, 1982
INVENTOR(S) : Victor J. Palma

It is certified that error appears in the above—identified patent and that said Letters Patent is hereby corrected as shown below:

On The Title Page, item (73) should read

-- Jeep Corporation, Southfield, Mich. --.

Column 1, line 67, after "Patent" and before "of", the word "No." should be omitted.
Column 1, line 68, after "et al" and before "4,091,494", the word -- No. -- should be inserted.
Column 2, line 5, "No." should be omitted from the beginning of the line and after "Mainka" and before "3,604,048" the word -- No. -- should be inserted
Column 2, line 11, after "Pat." and before "of", the word "Nos." should be omitted and after the word "Hatch" and before "3,019,469" the word -- Nos. -- should be inserted.
Column 6, line 25, after "storage" and before "106" the word -- area -- should be inserted.
Column 6, line 27, after "so", the word "tht" should read -- that --.

Signed and Sealed this

Twenty-second Day of June 1982

[SEAL]

Attest:

GERALD J. MOSSINGHOFF

*Attesting Officer*     *Commissioner of Patents and Trademarks*